United States Patent
Woolworth et al.

(10) Patent No.: US 10,487,690 B2
(45) Date of Patent: Nov. 26, 2019

(54) ACTIVELY CONTROLLED COOLING AIR EXHAUST DOOR ON AN AIRCRAFT ENGINE NACELLE

(71) Applicant: Rohr, Inc., Chula Vista, CA (US)

(72) Inventors: Kevin Woolworth, San Diego, CA (US); Michael S. Pretty, El Cajon, CA (US); Daniel J. Shetzer, San Diego, CA (US); Martin Channell, Chula Vista, CA (US); Thomas Holt, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 1250 days.

(21) Appl. No.: 14/462,106

(22) Filed: Aug. 18, 2014

(65) Prior Publication Data

US 2016/0047274 A1    Feb. 18, 2016

(51) Int. Cl.
| | |
|---|---|
| *F02C 6/08* | (2006.01) |
| *F02C 6/14* | (2006.01) |
| *F02K 3/11* | (2006.01) |
| *F02K 1/72* | (2006.01) |
| *F02K 1/76* | (2006.01) |

(Continued)

(52) U.S. Cl.
CPC .............. *F01D 25/24* (2013.01); *F02C 6/08* (2013.01); *F02C 7/18* (2013.01); *F02C 9/18* (2013.01); *F01D 25/14* (2013.01); *F02K 1/06* (2013.01); *F02K 1/10* (2013.01); *F02K 1/1207* (2013.01); *F02K 1/30* (2013.01); *F02K 1/32* (2013.01); *F02K 1/34* (2013.01); *F02K 1/70* (2013.01); *F02K 1/72* (2013.01); *F02K 1/76* (2013.01);

(Continued)

(58) Field of Classification Search
CPC .. F01D 25/14; F01D 25/24; F02C 6/08; F02C 9/18; F02K 1/06; F02K 1/30; F02K 1/32; F02K 1/34; F02K 1/1207; F02K 1/805; F02K 1/70; F02K 1/72; F02K 1/76; F02K 1/763; F02K 1/766
See application file for complete search history.

(56) References Cited

U.S. PATENT DOCUMENTS 3,910,375 A * 10/1975 Hache ..................... F02K 1/383
                                                                  181/215
3,981,466 A *  9/1976 Shah ...................... B64D 15/02
                                                                   165/42

(Continued)

OTHER PUBLICATIONS

EP search report for EP15181442 dated Jan. 12, 2016.

*Primary Examiner* — Todd E Manahan
*Assistant Examiner* — Eric W Linderman
(74) *Attorney, Agent, or Firm* — O'Shea Getz P.c.

(57) ABSTRACT

An assembly is provided for a turbofan engine. This turbofan engine assembly includes a cowling, a door and an actuation mechanism configured to actuate movement of the door in response to receiving a control signal. The cowling is configured to form a compartment at least partially around a case of the turbofan engine. The cowling includes an exhaust port that is fluidly coupled with the compartment. The door is configured to at least partially open and close the exhaust port. This variable exhaust port may be opened in case increased airflow is needed through the compartment, such as when increased cooling airflow is needed through an environmental air precooler that cools compressed air for the aircraft cabin and the precooler exhausts its cooling air into the compartment.

11 Claims, 6 Drawing Sheets

(51) Int. Cl.
  *F02K 1/30* (2006.01)
  *F01D 25/24* (2006.01)
  *F02C 7/18* (2006.01)
  *F02C 9/18* (2006.01)
  *F02K 1/80* (2006.01)
  *F02K 1/10* (2006.01)
  *F02K 1/70* (2006.01)
  *F01D 25/14* (2006.01)
  *F02K 1/32* (2006.01)
  *F02K 1/12* (2006.01)
  *F02K 1/34* (2006.01)
  *F02K 1/06* (2006.01)

(52) U.S. Cl.
  CPC .............. *F02K 1/763* (2013.01); *F02K 1/766* (2013.01); *F02K 1/805* (2013.01); *Y02T 50/675* (2013.01)

(56) References Cited

U.S. PATENT DOCUMENTS

| | | | | |
|---|---|---|---|---|
| 4,214,441 A * | | 7/1980 | Mouritsen | F02K 1/825 239/127.3 |
| 4,232,513 A | | 11/1980 | Pearson et al. | |
| 4,497,462 A * | | 2/1985 | Hamatani | B64C 1/1415 244/129.5 |
| 4,510,714 A * | | 4/1985 | Kasper | B64C 1/1415 244/129.5 |
| 4,825,644 A * | | 5/1989 | Bubello | B64D 29/00 60/200.1 |
| 5,038,560 A * | | 8/1991 | Seed | F02C 7/14 239/265.37 |
| 5,054,281 A * | | 10/1991 | Mutch | B64D 33/08 138/39 |
| 5,088,660 A | | 2/1992 | Karanian | |
| 5,203,163 A * | | 4/1993 | Parsons | F02C 6/08 60/226.1 |
| 5,224,342 A * | | 7/1993 | Lair | F02K 1/766 239/265.33 |
| 5,357,742 A * | | 10/1994 | Miller | B64D 33/08 244/53 B |
| 5,623,820 A * | | 4/1997 | Balzer | B64D 27/00 60/39.091 |
| 5,704,207 A | | 1/1998 | Jensen et al. | |
| 5,729,969 A * | | 3/1998 | Porte | F02C 6/08 60/226.1 |
| 5,782,077 A * | | 7/1998 | Porte | F02C 6/08 165/154 |
| 5,921,604 A * | | 7/1999 | Yu | F15B 15/1476 296/146.4 |
| 6,070,407 A * | | 6/2000 | Newton | F02K 3/075 239/265.19 |
| 6,094,908 A * | | 8/2000 | Baudu | F02K 1/70 244/110 B |
| 6,202,403 B1 * | | 3/2001 | Laborie | B64D 33/08 60/39.83 |
| 6,439,504 B1 * | | 8/2002 | Ahrendt | F02K 1/763 239/265.19 |
| 6,845,945 B1 * | | 1/2005 | Smith | B64D 33/04 239/265.19 |
| 7,810,312 B2 * | | 10/2010 | Stretton | F02C 7/141 60/226.1 |
| 7,861,513 B2 * | | 1/2011 | Stretton | B64C 7/02 60/226.1 |
| 7,886,520 B2 * | | 2/2011 | Stretton | F01D 17/105 239/265.17 |
| 7,926,261 B2 * | | 4/2011 | Porte | B64D 13/06 60/226.1 |
| 8,074,440 B2 * | | 12/2011 | Kohlenberg | B64D 33/04 60/226.1 |
| 8,141,337 B2 * | | 3/2012 | Porte | F02C 7/141 60/226.1 |
| 8,250,852 B2 * | | 8/2012 | Porte | F02C 7/141 60/226.1 |
| 8,418,471 B2 * | | 4/2013 | Baltas | F02K 1/15 60/226.1 |
| 8,439,308 B2 * | | 5/2013 | Armstrong | B64C 7/02 244/129.4 |
| 8,826,641 B2 * | | 9/2014 | Suciu | B64D 27/18 60/226.1 |
| 8,991,191 B2 * | | 3/2015 | Diaz | B64D 29/00 251/11 |
| 9,200,569 B2 * | | 12/2015 | Suciu | F02C 7/08 |
| 9,206,912 B2 * | | 12/2015 | Landre | F16K 3/30 |
| 9,234,481 B2 * | | 1/2016 | Suciu | F02C 7/14 |
| 9,624,831 B2 * | | 4/2017 | Brousseau | F02C 7/00 |
| 9,885,313 B2 * | | 2/2018 | Baltas | F02K 1/15 |
| 10,060,287 B2 * | | 8/2018 | Dahmen | F01D 21/14 |
| 2001/0032758 A1 * | | 10/2001 | Ruiz | F16D 65/12 188/71.6 |
| 2002/0157377 A1 * | | 10/2002 | Ahrendt | F02K 1/72 60/204 |
| 2003/0218094 A1 * | | 11/2003 | Lair | B64D 33/04 244/110 B |
| 2004/0068978 A1 * | | 4/2004 | Lair | F02K 1/70 60/226.2 |
| 2004/0118974 A1 * | | 6/2004 | Colotte | F02K 1/76 244/110 B |
| 2005/0102996 A1 * | | 5/2005 | Lair | E05B 47/0607 60/226.2 |
| 2005/0151012 A1 * | | 7/2005 | Lair | F02K 1/70 244/110 B |
| 2006/0150612 A1 * | | 7/2006 | Anderson | F02K 1/002 60/204 |
| 2007/0101731 A1 | | 5/2007 | Bayt et al. | |
| 2007/0245711 A1 * | | 10/2007 | Stretton | B64C 7/02 60/226.1 |
| 2007/0245738 A1 * | | 10/2007 | Stretton | F02C 7/141 60/728 |
| 2007/0245739 A1 * | | 10/2007 | Stretton | F01D 17/105 60/728 |
| 2008/0028763 A1 * | | 2/2008 | Schwarz | F01D 15/10 60/771 |
| 2008/0134664 A1 * | | 6/2008 | Brannon | F02K 1/70 60/226.2 |
| 2008/0230651 A1 * | | 9/2008 | Porte | B64D 13/06 244/118.5 |
| 2008/0246421 A1 * | | 10/2008 | Harvey | F02K 1/763 318/14 |
| 2009/0053058 A1 * | | 2/2009 | Kohlenberg | B64D 33/04 415/227 |
| 2009/0064655 A1 * | | 3/2009 | Regunath | G05B 9/02 60/39.091 |
| 2009/0178416 A1 * | | 7/2009 | Migliaro | F02K 1/15 60/771 |
| 2009/0188234 A1 * | | 7/2009 | Suciu | F02C 7/14 60/262 |
| 2009/0208328 A1 * | | 8/2009 | Stern | F02K 1/002 415/145 |
| 2009/0288387 A1 * | | 11/2009 | Baltas | F02K 1/15 60/204 |
| 2010/0326047 A1 * | | 12/2010 | Gabel | F02K 1/72 60/226.2 |
| 2011/0112047 A1 | | 5/2011 | Evans et al. | |
| 2011/0120075 A1 * | | 5/2011 | Diaz | B64D 29/00 60/39.11 |
| 2012/0137654 A1 * | | 6/2012 | Burgess | F02K 1/06 60/204 |
| 2013/0078081 A1 * | | 3/2013 | Chakkera | F02K 1/64 415/150 |
| 2013/0086922 A1 * | | 4/2013 | Suciu | F02C 7/14 60/802 |
| 2013/0098046 A1 * | | 4/2013 | Suciu | F02C 7/08 60/772 |
| 2013/0220435 A1 * | | 8/2013 | James | B64D 29/08 137/15.1 |
| 2013/0239582 A1 * | | 9/2013 | Suciu | F01D 15/08 60/785 |

(56) References Cited

U.S. PATENT DOCUMENTS

| | | | | |
|---|---|---|---|---|
| 2013/0239583 A1* | 9/2013 | Suciu | ......................... | F02C 6/08 |
| | | | | 60/785 |
| 2013/0264399 A1* | 10/2013 | Wingett | .................. | F02K 1/625 |
| | | | | 239/265.19 |
| 2013/0292489 A1* | 11/2013 | Vauchel | .................... | F02K 1/09 |
| | | | | 239/265.19 |
| 2013/0312387 A1* | 11/2013 | West | ......................... | F02K 1/09 |
| | | | | 60/226.2 |
| 2014/0000279 A1* | 1/2014 | Brousseau | ............. | B64D 13/08 |
| | | | | 60/782 |
| 2015/0275758 A1* | 10/2015 | Foutch | .................... | F02C 7/047 |
| | | | | 60/779 |
| 2015/0275769 A1* | 10/2015 | Foutch | ..................... | F02C 9/18 |
| | | | | 60/776 |
| 2015/0345395 A1* | 12/2015 | Moore | .................... | F02K 1/383 |
| | | | | 60/806 |
| 2016/0017804 A1* | 1/2016 | Afrianto | .................. | F02C 6/08 |
| | | | | 60/39.092 |
| 2016/0376995 A1* | 12/2016 | Ronan | ..................... | F01D 25/14 |
| | | | | 415/215.1 |
| 2017/0184030 A1* | 6/2017 | Brousseau | ................ | F02C 7/14 |
| 2017/0226961 A1* | 8/2017 | Smith | ...................... | F02K 1/72 |
| 2017/0275010 A1* | 9/2017 | Pretty | .................... | B64D 29/00 |
| 2019/0032601 A1* | 1/2019 | Harpal | ................... | F02K 1/763 |

* cited by examiner

ACTIVELY CONTROLLED COOLING AIR EXHAUST DOOR ON AN AIRCRAFT ENGINE NACELLE

BACKGROUND OF THE INVENTION

1. Technical Field

This disclosure relates generally to nacelles and engine build-up (EBU) hardware for aircraft propulsion engines, and more particularly, to the integration of cabin air pre-coolers into the same.

2. Background Information

A propulsion system for modern commercial transportation aircraft typically includes two or more turbofan engines. Each of these turbofan engines may be configured to deliver pressurized air from the engine's compressor section into the aircraft's cabin for use as environmental air. Such environmental air may be cooled after it is bled from the compressor section with a precooler to moderate its temperature. The precooler may be configured as a cross-flow heat exchanger, with cooling air ingested through the precooler to cool the environmental air.

The cooling air for the pre-cooler may be taken from any ambient air source, such as outside the nacelle or from the ambient air in the bypass air duct. The precooler may be mounted in the core compartment formed around the engine core and defined by the thrust reverser and/or other nacelle components. After the cooling air has passed through the precooler, it may be exhausted either into a duct that empties into the bypass fan duct or another ambient air region outside the nacelle, or it may be exhausted into the core compartment. The core compartment is ventilated with its own cooling air intakes and an exhaust that is positioned at the aft end of the core compartment between the bypass air exhaust and the engine exhaust. If spent cooling air is exhausted from the precooler into the core compartment, it flows through the core compartment and out of the existing core compartment exhaust.

The cooling air inlet and exhaust for the precooler are sized appropriately for the anticipated air flow through the precooler to adequately cool the environmental air. However, the range of the volume of cooling air flow can vary widely under certain conditions. If one of the engines or engine systems on the aircraft is disabled and not functioning, all of the environmental air for the cabin must be provided by the remaining engine and cooled in its associated precooler. In such a scenario of increased environmental air flow through the precooler, a corresponding increase in cooling air flow is also needed. This increased cooling air flow requirement must be accounted for in designing the cooling air inlet and exhaust system.

SUMMARY OF THE DISCLOSURE

According to an aspect of the invention, an assembly is provided for a turbofan engine. This turbofan engine assembly includes a cowling, a door and an actuation mechanism configured to actuate movement of the door in response to receiving a control signal. The cowling is configured to form a compartment at least partially around a case of the turbofan engine. The cowling includes an exhaust port therethrough which is fluidly coupled with the compartment. The door is configured to at least partially open and close the exhaust port.

According to another aspect of the invention, another assembly is provided for a turbofan engine. This turbofan engine assembly includes an inner fixed structure configured to form a core compartment. The inner fixed structure includes a variable area exhaust with an actuation mechanism. The variable area exhaust is fluidly coupled with the core compartment. The actuation mechanism is configured to actuate the variable area exhaust in response to receiving a control signal.

The turbofan engine assembly may be an inner fixed structure ("IFS") assembly.

The actuation mechanism may be configured to receive the control signal from an electronic controller.

The actuation mechanism may be configured to unlatch the door in response to receiving the control signal. The actuation mechanism may also or alternatively be configured to open the door in response to receiving the control signal, or another control signal. The actuation mechanism may also or alternatively be configured to close the door in response to receiving the control signal, or another control signal. The actuation mechanism may also or alternatively be configured to hold the door in an open position.

At least a portion of the door may be configured to move radially outward, relative to the cowling, as the door moves from a closed position to an open position.

At least a portion of the door may be configured to move radially inwards, relative to the cowling, as the door moves from a closed position to an open position.

A bifurcation cowling may be included, which bifurcation cowling may extend radially outward from the cowling.

A heat exchanger may be included, which heat exchanger may be fluidly coupled between an inlet duct and the compartment. This heat exchanger may be configured as a precooler for an aircraft fuselage air conditioning system.

The cowling may at least partially form another exhaust port fluidly coupled with the compartment and configured without a door.

The variable area exhaust may include a door configured to at least partially open and close an exhaust port in a cowling included with the inner fixed structure. The actuation mechanism may be configured to actuate movement of the door in response to receiving the control signal.

The inner fixed structure may include a fixed area exhaust fluidly coupled with the compartment.

A case may be included for housing a core of the turbofan engine. The core compartment may be formed radially between the inner fixed structure and the case.

The foregoing features and the operation of the invention will become more apparent in light of the following description and the accompanying drawings.

DETAILED DESCRIPTION OF THE INVENTION

Figure 1:
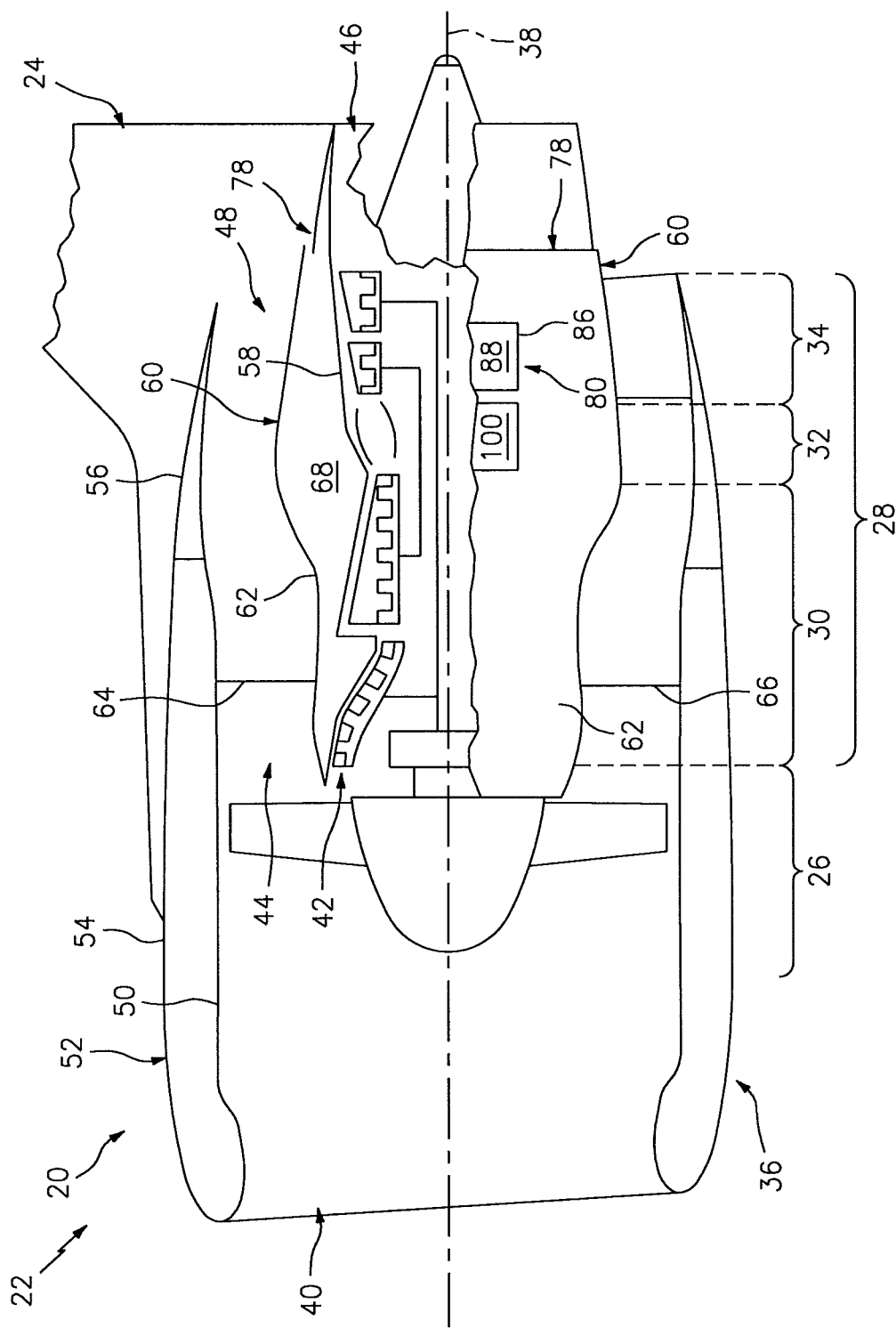
FIG. 1 is a side cutaway schematic illustration of an aircraft propulsion system with a turbofan engine which can provide pressurized environmental air for use in an aircraft's cabin.

FIG. 1 is a side cutaway illustration of a turbofan engine 20 configured as or included in a propulsion system 22 for an aircraft. The turbofan engine 20 is connected to an engine pylon 24, which may connect the turbofan engine 20 to the aircraft. The engine pylon 24, for example, may connect the turbofan engine 20 to a wing or a fuselage of the aircraft.

The turbofan engine 20 includes a fan section 26 and a turbine engine core 28. The engine core 28 includes a compressor section 30, a combustor section 32 and a turbine section 34. The turbofan engine 20 also includes an engine case 58.

The engine sections 26, 30, 32 and 34 are arranged sequentially along an axial centerline 38 of the turbofan engine 20 within the engine case 36. The compressor section 30 may include a low pressure compressor (LPC) section and a high pressure compressor (HPC) section. The turbine section 34 may include a high pressure turbine (HPT) section and a low pressure turbine (LPT) section.

During operation, air enters the turbofan engine 20 through a forward, upstream inlet 40. This air is directed through the fan section 26 and into a core flowpath 42 and into a bypass flowpath 44. The air within the core flowpath 42 may be referred to as "core air". The air within the bypass flowpath 44 may be referred to as "bypass air". The core air is directed through the engine sections 30, 32 and 34 and exits the turbofan engine 20 through an aft, downstream core exhaust 46 to provide forward engine thrust. Within the combustor section 32, fuel is injected into and mixed with the core air and ignited to power the turbine section 34. The bypass air is directed through the bypass flowpath 44 and may exit the turbofan engine 20 through an aft, downstream bypass exhaust 48 to provide a majority of the forward engine thrust. Some or all of the bypass air may be selectively redirected by a thrust reverser (not shown) to exit the propulsion system 22 in a partly forward direction to provide reverse engine thrust.

The nacelle 36 is a system of components or structures attached to the turbofan engine 20 and/or the engine pylon 24 which provides aerodynamic surfaces around the engine, defines a portion of the bypass flowpath 44, defines an appropriate inlet for the core flowpath 42 and the bypass flowpath 44, defines appropriate nozzles for the bypass exhaust 48 and the core exhaust 46, and houses or contains auxiliary devices for the engine and other components for the aircraft including various ducts, lines, pipes and wires. The nacelle 36 may be subdivided into an outer structure 52 and an inner structure 60 generally separated by the bypass flowpath 44. The outer structure 52 may include an inlet 50 and a fan cowl 54 (which generally overlaps the fan case of the engine). The outer structure 52 may also partially overlap a forward portion of the inner structure 60 with the outer structure providing a radially outer wall for the bypass flowpath 44 and the inner structure providing a radially inner wall. The outer nacelle 52 may also include a translating sleeve 56 aft of the fan cowl 54 which forms part of a thrust reverser. This translating sleeve 56 may be configured for varying the area of the bypass exhaust 48 and/or exposing vane arrays of the thrust reverser.

The inner structure 60 includes an inner fixed structure ("IFS") 62 which is in part a cylindrical or barrel-shaped cowl formed around the engine case 58 and helps define the core compartment 68. The IFS 62 houses and is configured to provide an aerodynamic cover for the engine case 58. The IFS 62 may also include one or more bifurcation cowlings 64 and 66. Each bifurcation cowling 64 and 66 connects the center barrel-shaped portion of IFS 62 to the outer structure 52. The upper bifurcation cowling 64 may also be included in or configured to provide an aerodynamic cover for a portion of the engine pylon 24. The IFS 62 may be formed with a left and a right clam-shell half which each are hinged between a closed position where they form a barrel around engine 20 and an open position for maintenance access to engine 20, in a known manner. In such a configuration, each IFS half may include an upper bifurcation 64 and a lower bifurcation 66. Of course, other configurations for the nacelle 36 are also possible.

The core compartment 68 may extend axially along the centerline 38 and circumferentially at least partially around turbofan engine 20. The core compartment 68 may also include the spaces between the upper bifurcations 64 of each half of IFS 62 and the space between the lower bifurcations 66 of each half. The precooler system 70 may be positioned inside of the core compartment 68, and in one specific example may be positioned between the upper bifurcations 64. The precooler system 70 may intake air through the IFS 62 for cooling the environmental air (from duct 71; see FIG. 2) in a heat exchanger, and exhaust the spent cooling air directly into the core compartment 68, or may exhaust the spent cooling air through a duct back through the IFS 62.

Figure 2:
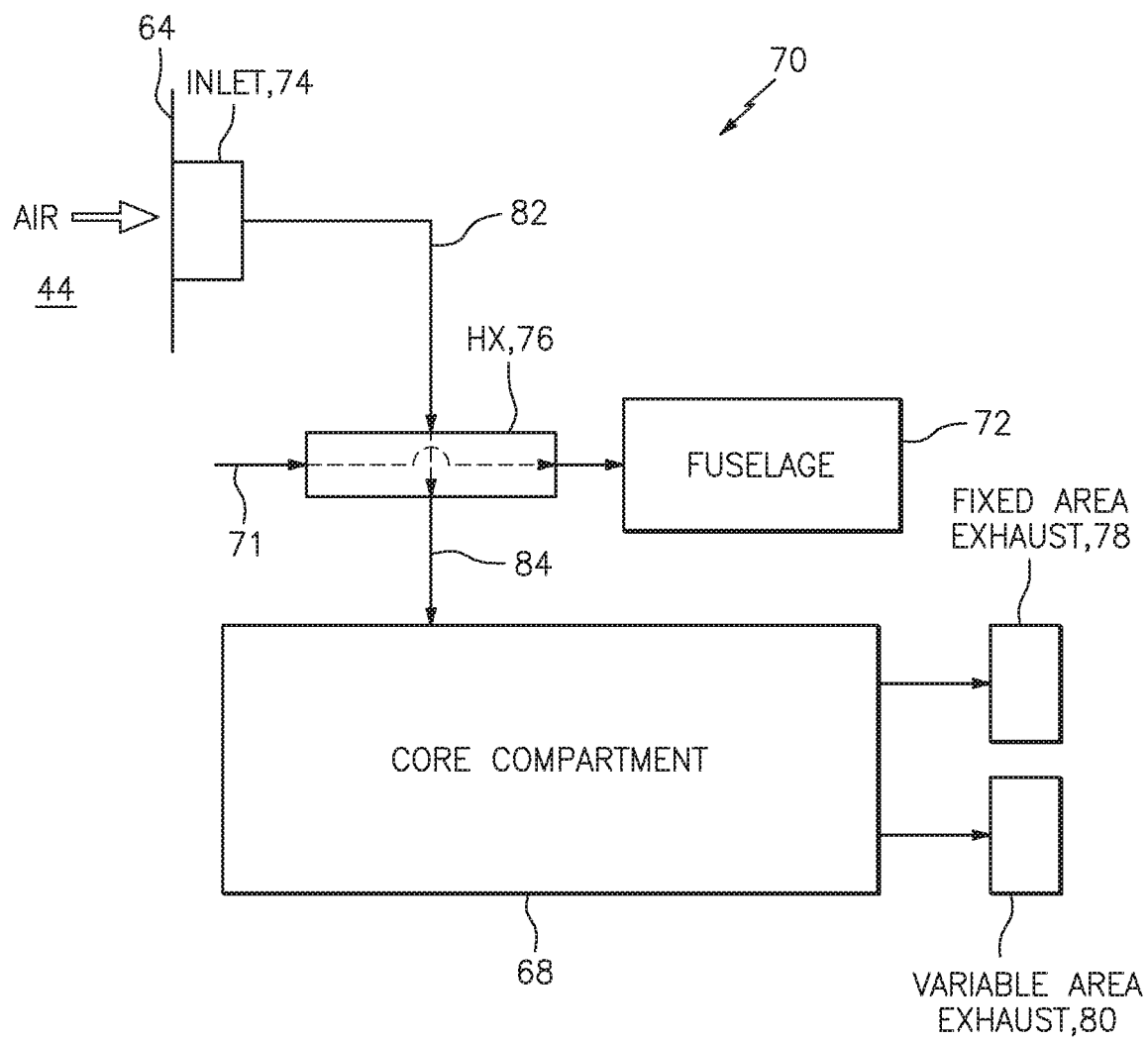
FIG. 2 is an air flow diagram of a precooler system for the environment air provided by the propulsion system of FIG. 1.

With reference to FIG. 2, the precooler system 70 includes an inlet 74, a heat exchanger 76 (e.g., a precooler), the core compartment 68, a fixed area exhaust 78 and a variable area exhaust 80. The inlet 74 may be configured in the upper bifurcation cowling 64, e.g., in a leading edge of the bifurcation cowling 64, or in another part of the IFS 62. The inlet 74 is fluidly coupled with the heat exchanger 76, for example, through an inlet duct 82. The heat exchanger 76 may be located inside of core compartment 68 and in such a case may exhaust spent cooling air directly into the core compartment. Alternatively, heat exchanger 76 may be integrated inside engine 20 or attached somewhere to the engine case 58 and may include a duct 84 which channels spent cooling air and exhausts it into core compartment 68. The core compartment 68 is fluidly coupled with the core compartment exhausts 78 and 80.

Referring again to FIG. 1, the fixed area exhaust 78 may be configured as a substantially annular exhaust port formed between adjacent (e.g., radially stepped) portions of the IFS 62 and the nozzle for the core exhaust 46. The IFS 62 and core exhaust nozzle may be substantially fixed relative to one another to fix the area of exhaust 78 throughout turbofan engine 20 operation.

Figure 3:
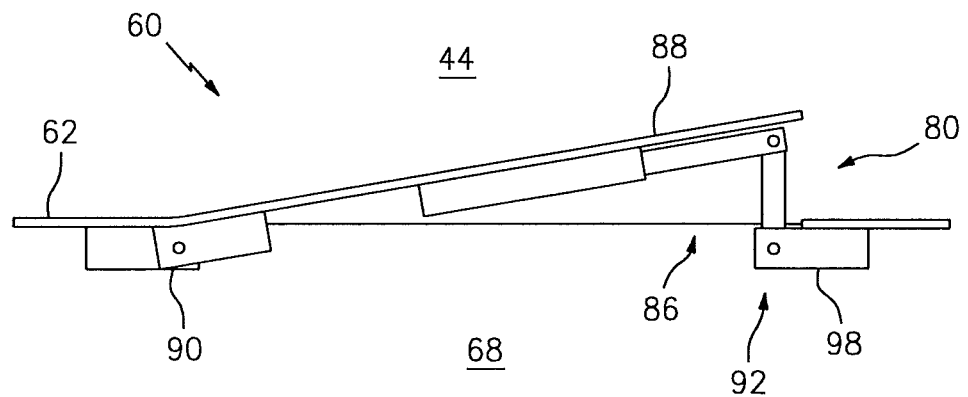
FIG. 3 is a side sectional schematic illustration of a portion of a variable area exhaust with its door in an open position.
Figure 4:
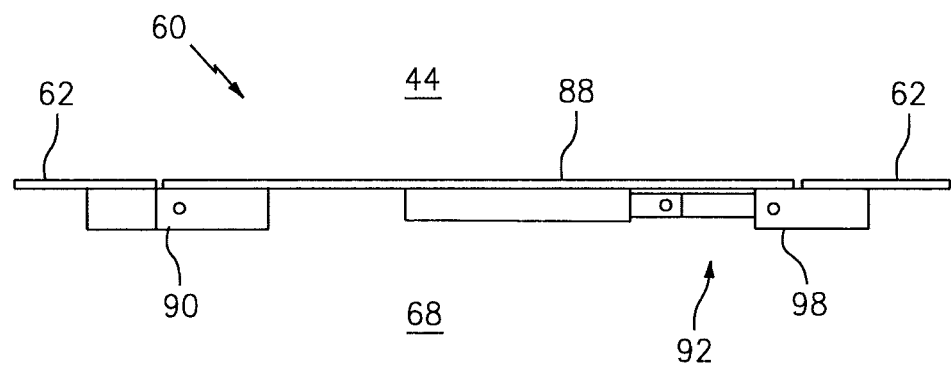
FIG. 4 is another side sectional schematic illustration of the variable area exhaust portion of FIG. 3 with its door in a closed position.
Figure 5:
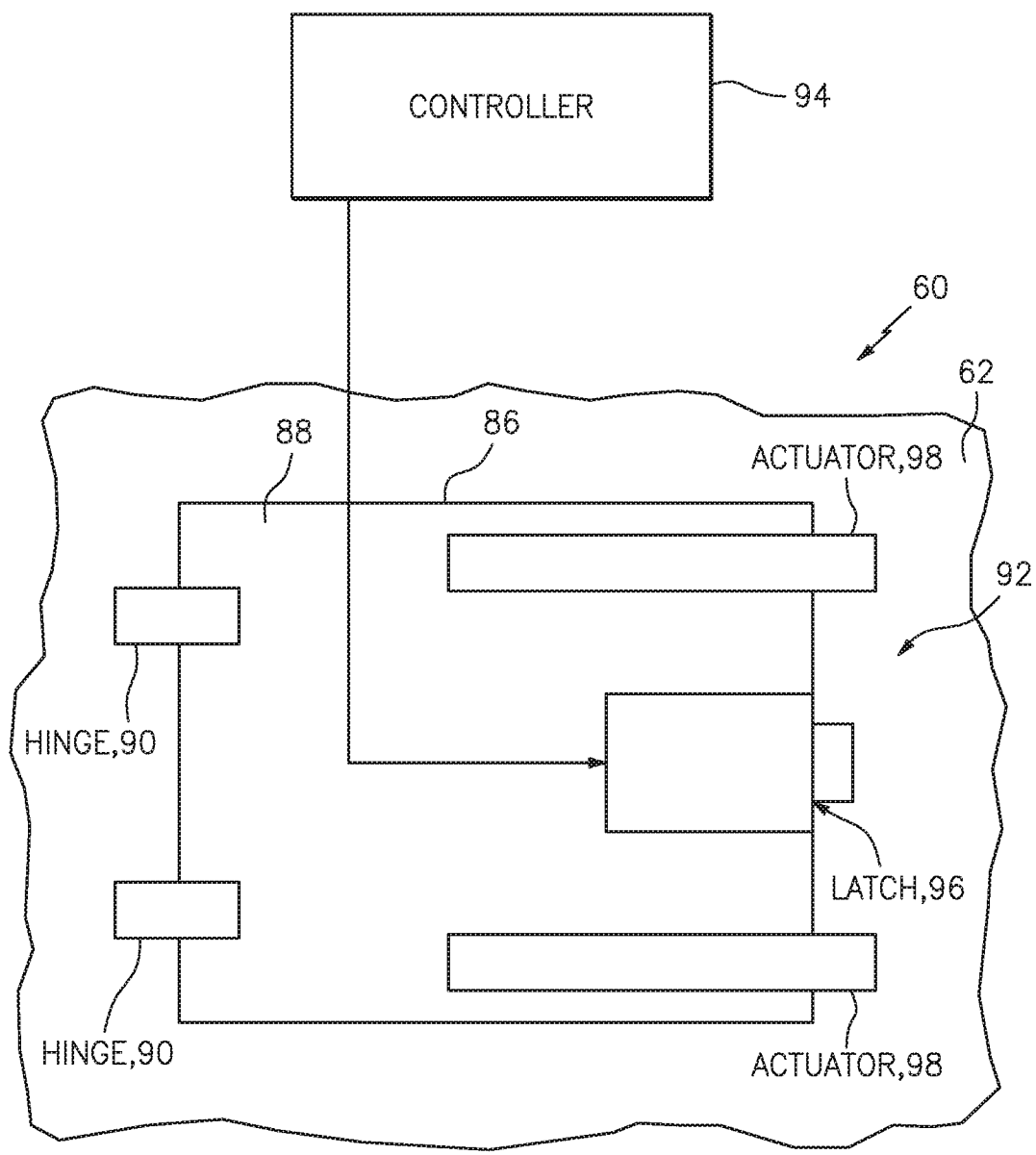
FIG. 5 is a plan view schematic illustration of the variable area exhaust portion of FIG. 3, a component of which is in signal communication with an electronic controller.
Figure 6:
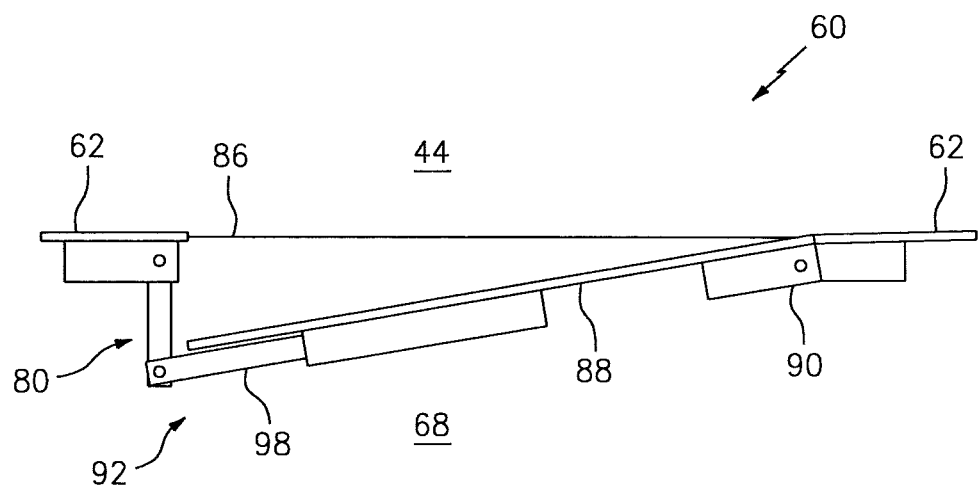
FIG. 6 is a side sectional schematic illustration of a portion of another variable area exhaust with its door in an open position.

The variable area exhaust 80 may be configured on the IFS 62. The variable area exhaust 80, for example, may include one or more exhaust ports 86 (one shown) formed in and disposed circumferentially around the IFS 62. Referring to FIGS. 3-5, each exhaust port 86 may be at least partially (e.g., substantially completely) opened and closed by at least one respective actuatable exhaust port door 88. A forward end of the door 88 may be pivotally attached to the cowling 62 by one or more hinges 90. In this manner, an aft portion of the door 88 may move radially outward to open the respective exhaust port 86. Alternatively, referring to FIG. 6, an aft end of the door 88 may be pivotally attached to the cowling 62 by the hinge(s) 90 such that a forward portion of the door 88 may move radially inwards to open the respective exhaust port 86. The variable area exhaust 80, however, is not limited to the foregoing exemplary embodiments. For example, the door 88 may also or alternatively be attached to the inner cowling 62 with devices other than hinges; e.g., slide mechanisms, linkages, etc.

Referring again to FIGS. 3-5, an actuation mechanism 92 is arranged with each door 88. The actuation mechanism 92 is configured to actuate movement of the door 88 in response to receiving a control signal (or signals) from an electronic controller 94 (see FIG. 5).

The electronic controller 94 may be located remote of the turbofan engine 20, e.g., within the aircraft fuselage 72, or the electronic controller may be or form part of the engine controller (FADEC) housed in the nacelle 36, or mounted on the fan case or the pylon. The electronic controller 94 may be implemented with a combination of hardware and software. The hardware may include memory and at least one processing device, which may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The actuation mechanism 92 may include a latch 96 and/or one or more actuators 98. The latch 96 is configured to latch the door 88 in its closed position (see FIG. 4) during at least one mode of operation. The latch 96 is configured to unlatch the door 88 during at least one other mode of operation such that the actuators 98 may move the door 88 into its open position (see FIG. 3). For example, during nominal engine operation, the latch 96 may hold the door 88 in its closed position. However, where the electronic controller 94 identifies and/or receives data indicative of a pressure buildup in the core compartment 68 and/or a need for the heat exchanger 76 to provide additional cooling (e.g., due to an engine out situation), the controller 94 may generate and provide the control signal to the latch 96. Upon receiving the control signal, the latch 96 may release the door 88.

The actuators 98 may be passive actuators. Each actuator 98, for example, may be configured to constantly (once activated) subject the door 88 to an opening force. In this manner, upon the latch 96 receiving the control signal and releasing the door 88, the actuators 98 automatically move the door 88 to its open position (see FIG. 3). Such actuators 98 may each include a system of one or more linkages and at least one biasing member (e.g., a spring). The linkages of such actuators 98 may also be configured to "lockout" such that once the door 88 is opened the door 88 is locked and thereby held in its open position.

Figure 7:
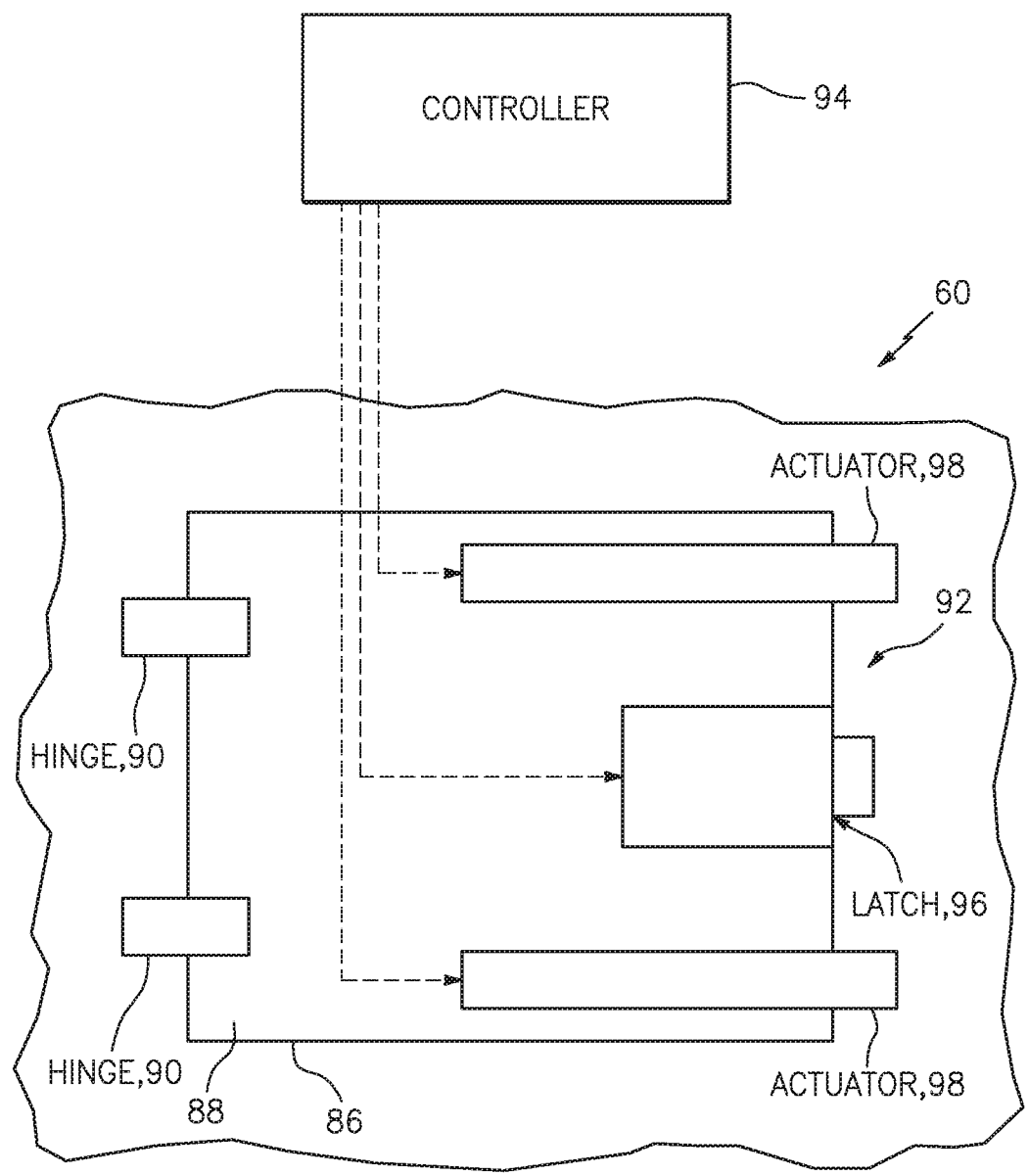
FIG. 7 is an outward looking illustration of a portion of another variable area exhaust, components of which are in signal communication with an electronic controller.

Alternatively, referring to FIG. 7, one or more of the actuators 98 may be active actuators. Each actuator 98, for example, may be configured to selectively subject the door 88 to an opening force upon receiving a control signal from the electronic controller 94. In this manner, the amount the door 88 opens and/or the speed with which the door 88 opens may be selectively controlled and regulated based on operating conditions. Each actuator 98 may also be configured to selectively subject the door 88 to a closing force upon receiving another control signal. In this manner, the door 88 may be closed if the triggering event stops; e.g., if pressure within the core compartment 68 substantially decreases and/or the need for the heat exchanger 76 to provide additional cooling subsides. The actuators 98 may each include an electric motor, a hydraulic piston and/or one or more other such devices.

In some embodiments, the actuation mechanism 92 may be configured without the actuators 98 where, for example, a pressure differential between the core compartment 68 and the bypass flowpath 44 is large enough to subject each door 88 to an opening force. Alternatively, the actuation mechanism 92 may be configured without the latch 96 where the actuators 98 are active actuators and operable to hold the door 88 in its closed position. Still alternatively, the latch 96 may be configured as an integral part of one or more of the actuators 98.

In some embodiments, the IFS 62 may be configured without the fixed area exhaust 78.

In some embodiments, referring to FIG. 1, the IFS 62 may also include one or more passively controlled doors 100; e.g., pressure relief doors. In contrast to the doors 88 described above, each pressure relief door 100 is configured to be automatically opened where its latch and/or actuator(s) is/are physically triggered by a pressure buildup within the core compartment 68, in a known manner. However, in other embodiments, the function of such pressure relief doors 100 may be performed by the doors 88. The latch 96 and/or actuators 98, for example, may be operated to actively control core compartment 68 pressure as described above and/or include an automatic and/or passive pressure triggered override.

In some embodiments, one or more of the doors 88 may each be configured as a flap; e.g., an exhaust nozzle flap.

In some embodiments, a variable area exhaust similar to the exhaust 80 described above may be formed elsewhere on the inner structure 60 of the nacelle, or somewhere on the outer structure 52, and may have an exhaust duct 84 leading thereto.

In some embodiments, one or more of the doors 88 may be located on the IFS 62 to provide access (e.g., for maintenance) to one or more components disposed radially therewithin; e.g., engine core 28 components. In this manner, the door(s) 88 may serve a dual purpose and may eliminate the need for one or more maintenance access panels in the region(s) of the door(s) 88. Of course, in other embodiments, the IFS may also include one or more maintenance access panels and/or one or more of the doors 100 may also be configured as maintenance access panels.

The variable exhaust 80, however formed, provides a controllable means to vary the total exhaust area of the heat exchanger 76 so that an appropriate exhaust area and minimal exhaust back pressure are maintained throughout all flight conditions, even when a single precooler system 70 is in operation and providing all the environmental air needed for the aircraft cabin. The variable exhaust 80 remains closed when the fixed exhaust 78 alone is sufficient for the needs of heat exchanger 76 and does not create an undesirably high exhaust back pressure. By remaining closed when not in use, the variable exhaust 80 minimizes drag losses and provides other advantages.

The terms "forward", "aft", "upstream", "downstream", "inner" and "outer" are used to orientate the components of the turbofan engine 20 assembly described above relative to the turbofan engine 20 and its centerline 38. A person of skill in the art will recognize, however, one or more of these components may be utilized in other orientations than those described above. The present invention therefore is not limited to any particular spatial orientations.

The turbofan engine assembly may be included in various turbine engines other than the one described above. The assembly, for example, may be included in a geared turbine engine where a gear train connects one or more shafts to one or more rotors in a fan section, a compressor section and/or any other engine section. Alternatively, the turbine engine assembly may be included in a turbine engine configured without a gear train. The turbine engine assembly may be included in a geared or non-geared turbine engine configured with a single spool, with two spools (e.g., see FIG. 1), or with more than two spools. The turbine engine may be configured as a turbojet engine or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An assembly for a turbofan engine, the assembly comprising:

an inner fixed structure configured to form a core compartment, the inner fixed structure including a variable area exhaust with an actuation mechanism; and a case for housing an engine core of the turbofan engine, wherein the core compartment is formed radially by and between the inner fixed structure and the case;

the variable area exhaust fluidly coupled with the core compartment; and the actuation mechanism configured to actuate the variable area exhaust in response to receiving a control signal;

the variable area exhaust comprising a door configured to at least partially open and close an exhaust port in a cowling included with the inner fixed structure; and the actuation mechanism comprising a latch and an actuator, the latch configured to unlatch the door in response to receiving the control signal, and the actuator configured to move the door from a closed position to an open position when the door is unlatched.

2. The assembly of claim 1, wherein the inner fixed structure further includes a fixed area exhaust fluidly coupled with the compartment.

3. The assembly of claim 1, wherein the actuation mechanism is configured to receive the control signal from an electronic controller.

4. The assembly of claim 1, wherein the actuation mechanism is configured to close the door.

5. The assembly of claim 1, wherein the actuation mechanism is configured to hold the door in the open position.

6. The assembly of claim 1, wherein at least a portion of the door is configured to move radially outward, relative to the cowling, as the door moves from the closed position to the open position.

7. The assembly of claim 1, wherein at least a portion of the door is configured to move radially inwards, relative to the cowling, as the door moves from the closed position to the open position.

8. The assembly of claim 1, further comprising a bifurcation cowling extending radially outward from the cowling.

9. The assembly of claim 1, further comprising a heat exchanger fluidly coupled between an inlet duct and the core compartment.

10. The assembly of claim 1, wherein the latch is configured discrete from the actuator.

11. The assembly of claim 1, wherein the actuation mechanism further comprises a second actuator, and the latch is spaced from and is between the actuator and the second actuator.

* * * * *